(12) United States Patent
Wind et al.

(10) Patent No.: US 11,466,806 B2
(45) Date of Patent: Oct. 11, 2022

(54) DEVICE FOR CURING A LINING SLEEVE COMPRISING A CAMERA DEVICE

(71) Applicant: SML Verwaltungs GmbH, Rohrbach (DE)

(72) Inventors: Herbert Wind, Albersweiler (DE); Christian Noll, Limburgerhof (DE)

(73) Assignee: SML VERWALTUNGS GMBH, Rohrbach (DE)

( * ) Notice: Subject to any disclaimer, the term of this patent is extended or adjusted under 35 U.S.C. 154(b) by 690 days.

(21) Appl. No.: 16/091,742

(22) PCT Filed: Apr. 6, 2017

(86) PCT No.: PCT/DE2017/100277
§ 371 (c)(1),
(2) Date: Feb. 20, 2020

(87) PCT Pub. No.: WO2017/174079
PCT Pub. Date: Oct. 12, 2017

(65) Prior Publication Data
US 2020/0240569 A1    Jul. 30, 2020

(30) Foreign Application Priority Data
Apr. 8, 2016  (DE) .................... 10 2016 106 497.1

(51) Int. Cl.
*F16L 55/165*  (2006.01)
*B29L 23/00*   (2006.01)
*B32B 1/08*    (2006.01)

(52) U.S. Cl.
CPC ........ *F16L 55/1656* (2013.01); *F16L 55/1654* (2013.01); *B29L 2023/006* (2013.01);
(Continued)

(58) Field of Classification Search
CPC ....... F16L 55/18; F16L 55/165; F16L 55/179; F16L 55/163; F16L 55/16; F16L 55/1652
(Continued)

(56) References Cited

U.S. PATENT DOCUMENTS 5,040,922 A * 8/1991 Himmler ................. F16L 55/18
                                                  405/184.2
5,577,864 A * 11/1996 Wood .................... F16L 55/179
                                                  405/184.2
(Continued)

FOREIGN PATENT DOCUMENTS

DE    202011003792 U1   10/2011
EP       0391046 A1    10/1990
(Continued)

OTHER PUBLICATIONS

The International Bureau of WIPO, International Preliminary Report on Patentability in International Application No. PCT/DE2017/100277 (dated Oct. 9, 2018).
(Continued)

*Primary Examiner* — Patrick F Brinson
(74) *Attorney, Agent, or Firm* — Neal, Gerber & Eisenberg LLP; Thomas E. Williams

(57) ABSTRACT

The invention relates to: a device for curing resin-soaked lining sleeves with energy-rich radiation, comprising at least one radiation source for generating energy-rich radiation for curing a lining sleeve, at least one camera for capturing an image sequence of an environment of the device, and at least one input device, in particular provided separately from the device, wherein a capturing region and/or a display region of the camera is/can be adjusted by a user by means of the input device, and wherein an adjustment of the capturing region of the camera occurs via a movement of at least one part of the camera and/or occurs by means of an electronic image-processing device, which is designed and configured to
(Continued)

adjust at least one camera parameter in accordance with an adjusted display region; and a use for a device of this type.

19 Claims, 1 Drawing Sheet

(52) U.S. Cl.
CPC ........... *B32B 1/08* (2013.01); *B32B 2260/046* (2013.01); *B32B 2597/00* (2013.01)

(58) Field of Classification Search
USPC ................ 138/98, 97; 405/184.2, 150.1, 157
See application file for complete search history.

(56) References Cited

U.S. PATENT DOCUMENTS

| | | | | |
|---|---|---|---|---|
| 5,915,419 A | * | 6/1999 | Tweedie | F16L 55/179 264/269 |
| 6,068,725 A | * | 5/2000 | Tweedie | F16L 55/179 264/269 |
| 9,023,160 B2 | * | 5/2015 | Warren | F16L 55/18 156/379 |
| 9,163,770 B2 | * | 10/2015 | Kiest, Jr. | B29C 73/025 |
| 9,453,607 B2 | * | 9/2016 | Moeskjaer | F16L 55/165 |
| 10,627,038 B2 | * | 4/2020 | Badger | F16L 55/44 |
| 2010/0051168 A1 | * | 3/2010 | Moeskjaer | F16L 55/18 156/64 |
| 2016/0010781 A1 | * | 1/2016 | Kiest, Jr. | B29C 73/025 138/98 |

FOREIGN PATENT DOCUMENTS

| | | |
|---|---|---|
| EP | 2256396 A1 | 12/2010 |
| WO | WO 2007/079542 A1 | 7/2007 |
| WO | WO 2017/174079 A1 | 10/2017 |

OTHER PUBLICATIONS

European Patent Office, International Search Report in International Application No. PCT/DE2017/100277 (dated Jun. 30, 2017).
European Patent Office, Written Opinion of the International Searching Authority in International Application No. PCT/DE2017/100277 (dated Jun. 30, 2017).

* cited by examiner

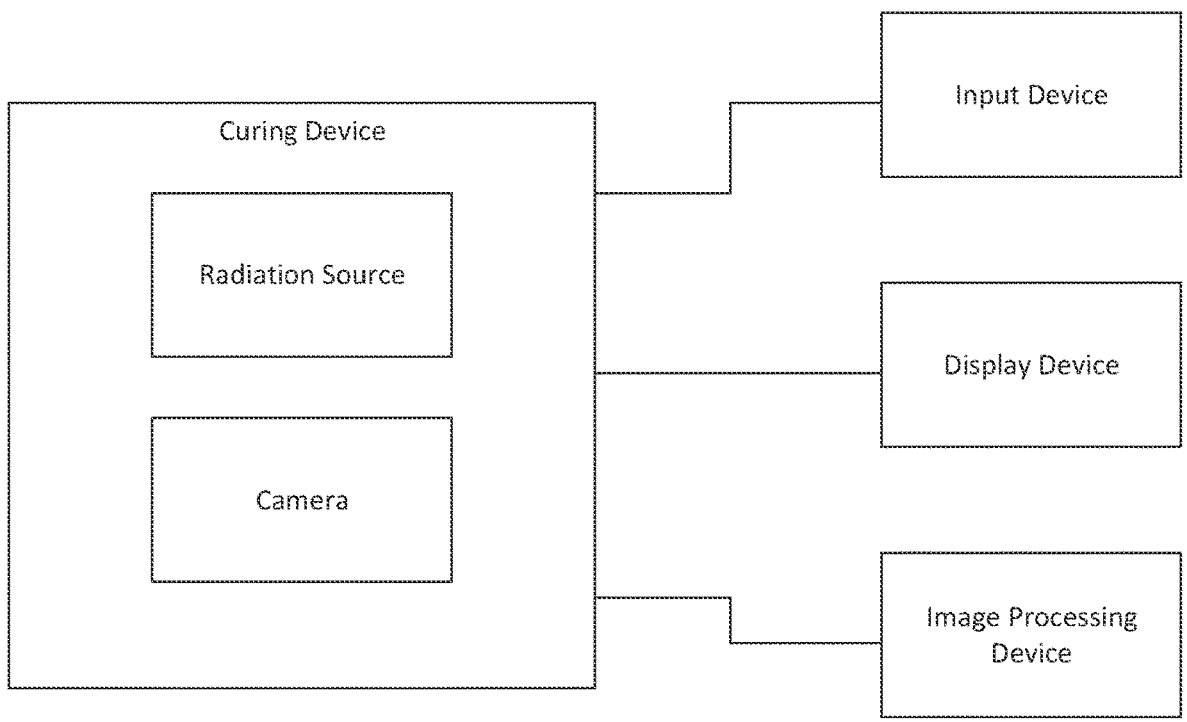

DEVICE FOR CURING A LINING SLEEVE COMPRISING A CAMERA DEVICE

The present invention relates to a device for curing a lining sleeve comprising a camera device.

Methods for rehabilitating line systems, in which for example liquid or gaseous media are transported, are known and widely described in the prior art.

For example, there are known methods in which the defective or damaged sections of the line system are replaced by new sections. However, this is laborious and also not always possible.

There are also known prior-art methods in which, for rehabilitating line systems, for example sewers and similar pipe systems, a flexible, curable ply impregnated with curable resin that serves as a lining sleeve and is also referred to as a liner is inserted into the line system. After insertion, the lining sleeve is expanded, so that it comes to lie closely against the inner wall of the line system. Subsequently, the resin is cured.

The production of such a lining sleeve is described for example in WO 95/04646. Such a lining sleeve usually comprises an opaque outer protective film, an inner film transmissive at least to certain wavelength ranges of electromagnetic radiation and a curable ply impregnated with a resin that is arranged between the inner film and the outer film.

The outer film sleeve is intended to prevent the resin that is used for impregnation escaping from the curable ply and getting into the environment. This presupposes good impermeability and attachment of the outer film sleeve to the resin-impregnated curable ply.

WO 00/73692 A1 discloses a lining sleeve comprising an inner film sleeve, a resin-impregnated fiber band as a curable ply and an outer sleeve, which is lined on its inner side with a nonwoven fabric.

Often, the resin-impregnated fiber band is wound in a helical and overlapping manner onto the inner sleeve of a lining sleeve to produce the same. The outer sleeve is subsequently likewise wound in a helical and overlapping manner around the resin-impregnated fiber band. Used in the prior art as curable resins are unsaturated polyester resins or vinyl ester resins, which may for example be dissolved in styrene and/or an acrylate. These unsaturated polyester or vinyl esters can be cured thermally (usually by peroxide catalysts) or by means of radiation, for example by UV light with photoinitiators, as described for example in EP-A 23623. Also possible are so-called combined curing processes, with a peroxide initiator used for the thermal curing in combination with photoinitiators, and these have proven to be advantageous in particular in the case of great wall thicknesses of the lining sleeves. A method for such so-called combined curing is described for example in EP-A 1262708. Unsaturated polyester or vinyl ester resins undergo shrinkage during the curing, which can impair the stability of the rehabilitated line system during later operation.

To make production easier, the inner sleeve itself is in this case also wound around a winding mandrel. Alternatively, for example, WO 95/04646 discloses that a prefabricated inner film sleeve is inflated and can itself be used as a winding mandrel. Such a prefabricated inner film sleeve is in this case produced from a film band, the film edges of which are connected to one another by welding or adhesive bonding to one another in order to form the inner film sleeve.

Before curing, the lining sleeves are inserted into the line system to be rehabilitated and are inflated by means of a fluid, generally compressed air. For inflating the lining sleeve, according to the prior art compressed air is applied to one opening end of the lining sleeve and the opposite opening end of the lining sleeve is closed with a closure device, known as a packer. This closure device in this case comprises a hollow cylinder and a covering element, with which the hollow cylinder can be closed.

For curing the lining sleeve, a curing device which comprises a radiation source is inserted into it and led through the curing sleeve in order to activate or perform the curing of the curable plies of the lining sleeve with the radiation energy.

The curing devices known from the prior art have the disadvantage here that sufficient visual monitoring of the curing process itself is not possible. A visual inspection by means of cameras is performed in advance by so-called inspection trips. Although camera systems that are in particular arranged at the front end of a curing device are known, they do not allow precise viewing and monitoring of the curing process in lateral or upper and lower regions.

Defective curing however leads to high costs and to a great time delay, since the already largely cured lining sleeve possibly has to be completely removed from the line to be rehabilitated, and the rehabilitation process has to be carried out once again thereafter.

Accordingly, the present invention was based on the object of overcoming the disadvantages of the prior art, and in particular providing a device that allows visual monitoring and curing in one.

FIG. 1 illustrates a schematic diagram of a device for curing resin-impregnated lining sleeves in accordance with the instant disclosure.

The object of the invention is achieved in particular by a device for curing resin-impregnated lining sleeves with high-energy radiation, comprising at least one radiation source for generating high-energy radiation for curing a lining sleeve, at least one camera for capturing a sequence of images of the surrounding area of the device and at least one input device, preferably separate from the curing device, wherein by means of the input device a capturing region and/or a display region of the camera can be set, or is set, by a user, and wherein setting of the capturing region of the camera is performed by moving at least part of the camera and/or is performed by means of an electronic image processing device, which is designed and set up to set at least one camera parameter in dependence on a set display region.

This object is achieved in particular by a device for curing resin-impregnated lining sleeves with high-energy radiation, comprising at least one radiation source for generating high-energy radiation for curing a lining sleeve, at least one camera for capturing a sequence of images of the surrounding area of the device and at least one input device, preferably separate from the curing device, wherein by means of the input device a capturing region and/or a display region of the camera can be set, or is set, by a user, and wherein setting of the capturing region of the camera is performed by moving at least part of the camera and/or is performed by means of an electronic image processing device, which is designed and set up to set at least one camera parameter in dependence on a set display region.

According to the invention, it has proven advantageous that a device for curing a lining sleeve does not have a camera with a fixed capturing region or display region, but that this region can be set by a user. Such setting may be performed by mechanically moving the camera or part of the camera, in particular at least the lens, or by setting a display region. The camera systems comprised by the invention are intended here to be in particular digital cameras.

A capturing region of the camera is intended according to the invention to be understood as preferably meaning the complete region picked up by the image sensor of a camera. A display region is intended according to the invention to be understood as preferably meaning a selection of a subregion of an image sensor of a camera that is displayed to a user. Therefore, a display region is in this case a displayed cutout of the capturing region.

According to the prior art, cameras with a rigid and invariable capturing or display region are used for curing devices. This has the effect that a user cannot view elements in the peripheral region or outside this rigid capturing or display region more precisely or at all. What is more, distortions of perspective and color occur, increasing from the center point of the lens used.

The device according to the invention enables a user to select portions and elements of interest to him that were previously not perceptible, and have them displayed during the curing. For this, the user can perform an input and select the desired region to be displayed by means of an input device, for example in the form of keys, a joystick and the like.

As stated, this can be performed according to the invention by a mechanical pivoting of the camera or of part of the camera. Alternatively, a so-called "region of interest" (ROI) may also be chosen. An ROI in this case allows not only the size of the image cutout (and consequently the resolution) to be fixed, but also its position. As a result, the amount of image data is reduced. The images can therefore also be transmitted more quickly. It must be noted here that selecting an image cutout not only leads to a reduction in the resolution, but at the same time also to a smaller format of the image displayed. This in turn influences the calculation of the focal length of the lens and, according to the invention, is to be taken into account. Methods for calculating a focal length of a lens when selecting an ROI to ensure a suitable resolution are known to a person skilled in the art from the prior art.

It has been shown within the scope of the present invention that an analog and digital pivoting of a capturing region or a pickup region for visualizing line systems during the curing of lining sleeves is advantageous to monitor the curing process and optionally optimize it by interventions in response to the images displayed.

Line systems within the context of the present invention are intended to be understood as meaning line systems of any kind for transporting liquid or gaseous media, which may be operated under negative pressure, normal pressure or positive pressure. Pipelines of any kind, pipeline systems for transporting media in chemical plants and production plants, pressure lines such as pressurized water pipes and drinking water pipes, and in particular also wastewater systems, which are laid underground or out of sight, may be mentioned here by way of example.

The use of the lighting means according to the invention for curing lining sleeves is also suitable in particular for the rehabilitation of such wastewater lines in sewer systems.

According to an exemplary embodiment of the present invention, it has proven to be advantageous that the at least one camera parameter comprises a subregion of the image sensor of the camera that is to be selected.

A problem affecting very high-resolution cameras with a very large angular field is that the resultant amount of data can only be transmitted error-free with great effort. This problem occurs in particular during curing processes in lining sleeves, since the radiation energy of the radiation sources causes interference in the data lines. What is more, the computational effort in the digital image processing device increases greatly in the case of a complete evaluation of high-resolution cameras. What is more, a large display device is required for presenting said wide-angle image, since otherwise a user cannot study the desired regions precisely, and they are only shown very small.

A wide-angle camera with high resolution consequently entails considerable disadvantages when transmitting the full image information. These disadvantages are overcome however by setting the display region according to the invention as an ROI, in which a subregion of the camera to be selected is fixed, or can be fixed, as a parameter. This reduces the amount of data to be transmitted and to be evaluated and allows a good graphical presentation of the chosen region on a display device. Subsequent image processing procedures, such as digital zoom, etc., are clearly possible as additionally advantageous refinements, in order to make certain display regions even better identifiable.

The digital pivoting according to the invention has proven to be particularly advantageous in this case, and can be performed in addition to or instead of a mechanical pivoting of the camera.

In may be advantageous in particular in this case that the camera comprises a wide-angle lens with a diagonal angular field of between 60° and 270°, in particular between 60° and 180°, in particular a fisheye lens.

Said angular fields have proven to be particularly advantageous to ensure a capturing region of a camera that is as large as possible. This can on the one hand make pivoting of the camera superfluous or reduce the paths of movement and/or reduce the number of individual cameras of a camera system that are required.

It may be preferred according to the invention that the at least one camera comprises a swivel head that is rotatable about a first axis and pivotable about a second axis, wherein electric motors that are in operative connection with the swivel head are comprised in particular for changing the position of the capturing region of the camera.

Such turning of the camera in a first axis, for example vertically from above to below or horizontally from right to left, with a second swivel axis, allows a great variable capturing region of the camera to be ensured, which the user can use for displaying selected regions of a line system.

According to one embodiment of the present invention, it may be advantageous in this case that the swivel head and/or the electric motors are arranged in a thermally insulating housing, in particular in a housing comprising at least one wall comprising at least one first thermally insulating layer and at least one second thermally insulating layer, wherein a vacuum is formed, or can be formed, between the first and second layers.

In the case of a curing process of a lining sleeve, high temperatures are produced by the radiation energy given off by the radiation source, with a very adverse influence on the reliability of the electric motors necessary for mechanically pivoting the camera. Such high temperatures do not occur during inspection trips with inspection devices, and so the invention was based on the surprising finding that a thermal insulation of the swivel head and/or of the electric motors significantly increases the reliability and service life and allows their use in a curing device to become possible.

A doubled-walled configuration of the housing, which forms a vacuum between the walls, has proven to be particularly advantageous here. As result, an optimum thermal insulation can be provided. It is obvious here to a person skilled in the art that other insulating configurations are also possible, and the present invention is not restricted to the double-walled housing configuration described.

It may also be provided according to one embodiment that the at least one camera is arranged in particular at or in the region of the front end and/or at or in the region of the rear end of the device.

An arrangement at the front or rear end of the device has proven to be particularly advantageous for visualizing the curing process, in order to be able to view the not yet cured lining sleeve before the curing and/or to be able to view the cured lining sleeve. The terms front and rear ends serve here exclusively for easier understanding of the present invention, and are intended to fix end points of the device in the longitudinal direction. The feature in the region of the front or rear end is intended to define an arrangement of a camera at a distance in a range of up to 20%, preferably of 15%, particularly preferably of up to 10%, from the front or rear end with respect to the length of the device measured from the front end to the rear end.

It goes without saying that it may in this case also be provided that a camera is arranged exclusively or additionally at the upper and/or lower end or in the region of the upper and/or lower end.

Furthermore, it may be preferred that at least two cameras are comprised, the capturing regions of which are not arranged overlapping one another, or only partially overlapping one another, and the captured information of which is evaluated together by the electronic image processing device.

Instead of the use of just one particularly high-resolution camera with a very large angular field, it may be provided that a number of cameras together form a camera system. Such a camera system is referred to in the present case synonymously as a camera. The use of a number of cameras of which the capturing regions do not overlap, or only overlap partially, and of which the captured information is evaluated together by the electronic image processing device may be accompanied by several advantages. On the one hand, such cameras can be more economical than the use of only one camera, since it is possible to rely on commonly used cameras. Furthermore, a greater angular field can be achieved, with at the same time smaller distortions, since the individual captured image cutouts are only subsequently put together digitally. It may also be advantageous that the reliability of the overall system is increased, since the failure of one camera still allows at least subregions of a line system to continue to be captured, and consequently the curing to be monitored at least in parts.

It may also be preferred in this case that the electronic image processing device calculates and displays the set display region on the basis of the captured information of all the cameras.

Taking into account information of all the cameras has the effect that the display region presented is the one that is set by the user as desired, and may also be calculated from two or more sub-images of separate cameras by means of the electronic image processing device.

According to one embodiment of the present invention, it may be provided that the digitized data selected by the image processing device can be subjected to a digital correction, in particular an elimination of distortion.

Many lenses have a pincushion-shaped or barrel-shaped distortion. Straight lines are in this case not depicted as straight lines, unless they run through the center point of the image. In the case of complex lenses with many lens elements, "wavy" distortions may also occur. A certain factor here is the radial distortion, which results from the structural form of the lens element and increases with increasing focal length. A further factor is the tangential distortion, which is also referred to as decentering distortion. It results from the fact that the lens and the CCD chip, but also the individual optical and mechanical component parts of a lens, are not perfectly aligned with one another.

Particularly in the case of lenses with a large angular field, and in particular in the case of a fisheye lens, it is advantageous if these distortions are corrected by means of electronic image processing. In the case of correction by means of electronic image processing, use is made of the fact that the extent of the distortion usually depends on the distance from the center point of the image. For such a case, the image may be described by polar coordinates. The position of the image points is in this case represented by the distance from the center point of the image and an angle, for example from the horizontal. The correction to be applied depends on the distance from the center point of the image and can be described as a mathematical function.

The electronic image processing device according to the invention can correct said distortion with an oppositely directed distortion of the image. This involves calculating which pixel respectively corresponds to the undistorted pixel, which is very complex because of the nonlinearity of the equation. Lateral chromatic aberration can be significantly reduced by such image warping separately for the red, green and blue channels. Alternative methods of correction are also known in the prior art, and have proven to be somewhat advantageous, such as for example a calculation of undistorted image points by iteration.

Finally, it may be provided that the device is in operative connection, or can be brought into operative connection, with a display device, wherein the capturing region and/or the display region of the camera is displayed, or can be displayed, on the display device.

It is usual for the curing of lining sleeves that it is controlled from outside the actual line by a user. For this purpose, on the one hand the control signals are transmitted from an operator control element to the device and on the other hand the captured camera information is transmitted to a display device, so that the user can rely on the camera information for the control.

According to the invention, it may be advantageous according to one embodiment of the present invention that a gas discharge lamp, a short arc lamp, a stroboscope lamp, a flash lamp, an arc lamp, in particular a xenon lamp, and/or a mercury-xenon lamp is comprised by the device as a radiation source.

The lining sleeves generally have as the curable and/or curing ply one or more fiber bands that are impregnated with a curable resin. Suitable in this case in principle as fiber bands are all products known to a person skilled in the art in the form of woven, knitted or laid fabrics, mats or nonwovens, which may contain fibers in the form of long continuous fibers or short fibers. Corresponding products are known per se to a person skilled in the art and are commercially available in great variety from various manufacturers. Such lining sleeves can be optimally cured with radiation sources according to the invention.

Within the scope of the present invention, fiber bands in the context of the invention should also be understood as including felts. A felt is a sheet-like formation comprising a disordered fibrous material that can only be separated with difficulty. In principle, felts are consequently non-woven textiles. Felts are generally produced from man-made fibers and vegetable fibers by dry needle punching (known as needle felts) or by consolidation with water jets emerging at high pressure from a nozzle bar. The individual fibers in the felt are entangled with one another in a disordered arrangement. Felts have good temperature resistance and are generally moisture-repellent, which may be of advantage when they are used in liquid-carrying systems.

The length of the fibers used is not subject to any particular restriction, i.e. both so-called long fibers and also short fibers or fiber fragments can be used. The properties of the corresponding fiber bands can also be set and controlled over wide ranges by the length of the fibers used.

The type of fibers used is also not subject to any restriction. Mentioned here just by way of example are glass fibers, carbon fibers or synthetic fibers such as aramid fibers or fibers of thermoplastics such as polyesters or polyamides or polyolefins (for example polypropylene), which are known along with their properties to a person skilled in the art and are commercially available in great variety. For economic reasons, glass fibers are generally preferred; if, however, a particular heat resistance for example is of importance, it is possible to use for example aramid fibers or carbon fibers, which can offer advantages in comparison with glass fibers with regard to strength at higher temperatures.

The lining sleeves may contain one or more fiber bands, which may also be the same or different.

Finally, the invention provides a use of a device according to the invention in a lining sleeve and/or as a curing device for lining sleeves, in particular for curing the lining sleeve, preferably for curing the curable ply of the lining sleeve.

The present invention is consequently based on the surprising finding that a monitoring of a curing process of a lining sleeve by a user can be significantly improved if it does not rely on a stationary camera, but instead the user can set a desired capturing region or display region on an analog or digital basis. It may in this case be provided that an individual camera is used, but it may likewise be advantageous according to some embodiments that a number of individual cameras are combined to form a camera system, which is also referred to here as a camera, and are evaluated together by the electronic image processing device.

The device according to the invention thus makes it possible for the first time that a user can set any desired cutouts of a lining sleeve during the curing, and have them displayed, in order to monitor a curing process in which the capturing region or display region is formed pivotably on a digital or analog basis.

The features of the invention disclosed in the foregoing description and the claims may be essential both individually and in any desired combination for implementing the invention in its various embodiments.

The invention claimed is:

1. A device for curing resin-impregnated lining sleeves with high-energy radiation, comprising: at least one radiation source for generating high-energy radiation for curing a lining sleeve, at least one camera for capturing a sequence of images of a surrounding area of the device and at least one input device, preferably separate from the curing device, wherein by means of the input device a capturing region and/or a display region of the camera can be set, or is set, by a user, and wherein setting of the capturing region of the camera is performed by moving at least part of the camera and/or is performed by means of an electronic image processing device, which is designed and set up to set at least one camera parameter in dependence on a set display region, wherein the at least one camera parameter comprises a subregion of an image sensor of the camera that is to be selected.

2. The device as claimed in claim 1, wherein the at least one camera comprises a wide-angle lens with a diagonal angular field of between 60° and 270°.

3. The device as claimed in claim 1, wherein the at least one camera comprises a swivel head that is rotatable about a first axis and pivotable about a second axis, wherein electric motors that are in operative connection with the swivel head are comprised in particular for changing a position of the capturing region of the at least one camera.

4. The device as claimed in claim 3, wherein the swivel head and/or the electric motors are arranged in a thermally insulating housing, in particular in a thermally insulating housing comprising at least one wall comprising at least one first thermally insulating layer and at least one second thermally insulating layer, wherein a vacuum is formed, or can be formed, between the first and second thermally insulating layers.

5. The device as claimed in claim 1, wherein the at least one camera is arranged in particular at or in a region of a front end and/or at or in a region of a rear end of the device.

6. The device as claimed in claim 1, comprising at least two cameras, wherein the capturing regions of the at least two cameras are not arranged overlapping one another, or only partially overlapping one another, and wherein captured information of the at least two cameras is evaluated together by the electronic image processing device.

7. The device as claimed in claim 6, wherein the electronic image processing device calculates and displays the set display region on the basis of the captured information of all the cameras.

8. The device as claimed in claim 1, wherein digitized data selected by the image processing device can be subjected to a digital correction.

9. The device as claimed in claim 1, wherein the device is in operative connection, or can be brought into operative connection, with a display device, wherein the capturing region and/or the display region of the at least one camera is displayed, or can be displayed, on the display device.

10. A method of using the device as claimed in claim 1 in a lining sleeve and/or as a curing device for lining sleeves.

11. A device for curing resin-impregnated lining sleeves with high-energy radiation, the device comprising:
at least one radiation source for generating high-energy radiation;
at least one camera for capturing a sequence of images of a surrounding area of the device;
an electronic image processing device configured to eliminate distortion of the sequence of images captured by the at least one camera; and
at least one input device that is configured to set a capturing region of the at least one camera, wherein the capturing region is set by moving at least part of the at least one camera.

12. The device of claim 11, wherein the at least one camera comprises a wide-angle lens with a diagonal angular field of between 60° and 270°.

13. The device of claim 11, wherein the at least one camera comprises a swivel head that is rotatable about a first axis and pivotable about a second axis, and including electric motors that are operatively connected with the swivel head for changing the position of the capturing region of the at least one camera.

14. The device of claim 13, wherein the swivel head or the electric motors are arranged in a thermally insulating housing comprising at least one wall having at least one first thermally insulating layer and at least one second thermally insulating layer, wherein a vacuum is disposed between the first and second thermally insulating layers.

15. The device of claim 11, wherein the at least one camera is arranged in a region of a front end or in a region of a rear end of the device.

16. The device of claim 11, including at least two cameras, wherein the respective capturing regions do not overlap one another, and wherein the device further comprises an electronic image processing device configured to evaluate captured information from the at least two cameras.

17. The device of claim 11, wherein the device is in operative connection, or can be brought into operative connection, with a display device, wherein the capturing region of the at least one camera is displayable on the display device.

18. A method of curing resin-impregnated lining sleeves, comprising:
   inserting a curing device into the lining sleeve, wherein the curing device comprises
      at least one radiation source for generating high-energy radiation,
      at least one camera for capturing a sequence of images of the surrounding area of the curing device, and
      at least one input device; and
   receiving, by the at least one input device, a movable capturing region of the at least one camera as selected by a user, wherein the step of receiving the capturing region includes moving at least part of the camera including at least a lens;
   eliminating distortion of the sequence of images captured by the at least one camera; and
   operating the curing device to cure a curable ply of the lining sleeve.

19. A device for curing resin-impregnated lining sleeves with high-energy radiation, comprising: at least one radiation source for generating high-energy radiation for curing a lining sleeve, at least one camera for capturing a sequence of images of the surrounding area of the device and at least one input device, preferably separate from the curing device, wherein by means of the input device a capturing region and/or a display region of the camera can be set, or is set, by a user, and wherein setting of the capturing region of the camera is performed by moving at least part of the camera and/or is performed by means of an electronic image processing device, which is designed and set up to set at least one camera parameter in dependence on a set display region, and wherein digitized data selected by the image processing device can be subjected to a digital correction.

* * * * *